(12) United States Patent
Wu et al.

(10) Patent No.: US 6,685,845 B2
(45) Date of Patent: Feb. 3, 2004

(54) PROCESS FOR PRODUCING MAGNETIC HEAD POLES UTILIZING SPUTTERED MATERIALS AND A RECORDING HEAD MADE THEREBY

(75) Inventors: Andrew L. Wu, Shrewsbury, MA (US); Jeffrey G. Greiman, Worcester, MA (US); Lawrence G. Neumann, Lancaster, MA (US); Vijay K. Basra, Reading, MA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/335,685

(22) Filed: Dec. 31, 2002

(65) Prior Publication Data

US 2003/0094432 A1 May 22, 2003

Related U.S. Application Data

(62) Division of application No. 09/317,484, filed on May 24, 1999, now Pat. No. 6,500,351.

(51) Int. Cl.[7] .................................................. B44C 1/22
(52) U.S. Cl. ...................................................... 216/22
(58) Field of Search ............................. 216/22, 37, 41, 216/66, 75, 100; 438/3, 695, 712, 713, 704; 360/119, 125, 126, 128, 131; 427/259, 264, 270, 271, 272, 128, 130, 131; 134/1.3, 37; 338/32 R; 29/603.07, 603.08

(56) References Cited

U.S. PATENT DOCUMENTS

| | | | | |
|---|---|---|---|---|
| 4,443,294 A | * | 4/1984 | Suenaga et al. | 216/22 |
| 4,529,860 A | * | 7/1985 | Robb | 219/121.41 |
| 4,970,616 A | * | 11/1990 | Ramaswamy | 360/122 |
| 5,315,793 A | * | 5/1994 | Peterson et al. | 451/2 |
| 5,639,509 A | * | 6/1997 | Schemmel | 427/130 |
| 5,705,443 A | * | 1/1998 | Stauf et al. | 438/722 |
| 5,733,820 A | * | 3/1998 | Adachi et al. | 438/719 |
| 5,751,526 A | * | 5/1998 | Schemmel | 360/317 |
| 5,753,131 A | * | 5/1998 | Choukh et al. | 216/22 |
| 5,793,579 A | * | 8/1998 | Yamamoto et al. | 360/126 |
| 5,804,085 A | * | 9/1998 | Wu et al. | 216/22 |
| 5,867,890 A | * | 2/1999 | Hsiao et al. | 29/603.14 |
| 5,874,010 A | * | 2/1999 | Tao et al. | 216/22 |
| 5,893,981 A | * | 4/1999 | Dovek et al. | 216/22 |
| 5,916,423 A | * | 6/1999 | Westwood | 204/192.32 |
| 5,935,453 A | * | 8/1999 | Fontana et al. | 216/22 |
| 5,938,941 A | * | 8/1999 | Ishiwata et al. | 216/22 |
| 6,007,731 A | * | 12/1999 | Han et al. | 216/22 |
| 6,069,775 A | * | 5/2000 | Chang et al. | 360/126 |
| 6,106,679 A | * | 8/2000 | Westwood | 204/192.32 |

FOREIGN PATENT DOCUMENTS

| | | | | |
|---|---|---|---|---|
| JP | 07021533 A | * | 1/1995 | G11B/5/39 |
| JP | 08180330 A | * | 7/1996 | G11B/5/39 |

* cited by examiner

Primary Examiner—Gregory Mills
Assistant Examiner—Robert S. P. Culbert
(74) Attorney, Agent, or Firm—Tejpal S. Hansra

(57) ABSTRACT

A recording head pole production process, and a pole made by the process, in which a combination of wet and dry etching steps are utilized to advantageously provide an undercut in the relatively high magnetic moment material beneath a photoresist area used to define the pole such that any re-deposited layer of material which occurs on the sides of the pole and photoresist area during the dry etching operation is advantageously rendered substantially discontinuous, or weakly linked, and the re-deposited material remaining on the pole itself following a photoresist strip can then be removed by being subjected to a stream of gaseous particles and ultimately carried away by the accompanying gas stream itself. In a particular embodiment disclosed herein the relatively high magnetic moment material may comprise a sputter deposited layer of cobalt-zirconium-tantalum (CoZrTa), iron-aluminum-nitride (FeAlN), iron-tantalum-nitride (FeTaN), iron-nitride (FeN) or similar materials. The stream of gaseous particles may be formed utilizing the expansion of a gaseous material, such as liquid carbon dioxide ($CO_2$), through a nozzle directed at the re-deposited material remaining on the pole following the photoresist strip operation.

12 Claims, 3 Drawing Sheets

PROCESS FOR PRODUCING MAGNETIC HEAD POLES UTILIZING SPUTTERED MATERIALS AND A RECORDING HEAD MADE THEREBY

CROSS REFERENCE TO RELATED APPLICATION

This is a divisional of U.S. patent application Ser. No. 09/317,484, filed May 24, 1999, now U.S. Pat. No. 6,500,351, which is incorporated herein by reference.

BACKGROUND OF THE INVENTION

The present invention relates, in general, to the field of magnetoresistive ("MR") and giant magnetoresistive ("GMR") recording heads. More particularly, the present invention relates to a process for producing poles in a magnetic recording head utilizing sputtered materials and a magnetic recording head made thereby.

MR and GMR read heads, or sensors, are known to be useful in reading data from a magnetic surface with a sensitivity exceeding that of inductive or other thin-film heads. In operation, the sensor is used to detect magnetic field signal changes encoded on a magnetic surface through a change in resistance which is exhibited due to the direction and strength of the associated magnetic flux being sensed. Currently, the magnetic field signal changes representing the data encoded on the particular storage medium is "read" by an MR or GMR read head and "written" by a related write, or recording, head. In those instances wherein the read head has associated shield layers, the write head may utilize the "top" shield as a bottom pole thereby providing what is known as a "merged" or "shared" shield pole structure. In any event, a typical thin film recording head ultimately comprises two magnetic poles, a top and bottom pole that surround a coil forming a write gap.

In conventional magnetic recording heads, nickel iron (NiFe), or permalloy, is generally used as the pole material. However, as the recording areal density of storage devices continues to increase, more advanced pole materials having a higher magnetic moment are required. While conventional permalloy poles can be produced using well known electroplating techniques and result in relatively well defined edge profiles and good width control, many of the known high magnetic moment materials such as cobalt-zirconium-tantalum (CoZrTa), iron-aluminum-nitride (FeAlN), iron-tantalum-nitride (FeTaN) and iron nitride (FeN) can only be sputter deposited, thereby making it extremely difficult to pattern and produce well defined poles.

Moreover, conventional wet chemical etch processes are also incapable of producing poles with good width control and desirable edge profiles. On the other hand, while dry etch techniques such as ion-milling can provide acceptable width control, they nevertheless result in the re-deposition of the etched materials on the sides of the pole resulting in undesirable "bunny ear" structures. These structures promote the formation of voids between them following encapsulation (or overcoat), particularly with the narrow pole widths required for higher areal recording density using relatively high magnetic moment materials.

Consequently, there has heretofore been no technique available for producing or achieving well defined poles free of "bunny ears" in a magnetic recording head using sputter deposited materials such as currently known high magnetic moment materials.

SUMMARY OF THE INVENTION

In accordance with the technique of the present invention, a magnetic recording head and process for producing the same is provided wherein a relatively high magnetic moment material is sputter deposited or otherwise formed on a substrate. A standard photoresist pattern is then applied to the high magnetic moment material layer to define the desired pole. A first wet chemical etch step is then utilized to produce a predetermined amount of lateral etch and a predetermined amount of etch depth beneath the photoresist. In a preferred embodiment, the ratio of the lateral etch to the etch depth is advantageously on the order of 3:1 or greater in order to facilitate the establishment of a substantially discontinuous, or weakly linked, layer of re-deposited material on the sides of the photoresist and high magnetic moment material. A subsequent dry etch step, such as ion milling, is then used to etch the remaining part of the relatively high magnetic moment material layer using timed etch or end point detection.

Because ion milling is a relatively long operation, re-deposition of the etched material occurs and the skin of the photoresist tends to harden making it more difficult for the solvent in a subsequent photoresist removal step to penetrate the photoresist. In this regard, the substantial discontinuity, or weak link, formed in the re-deposited material due to the lateral undercut serves to facilitate the later removal of the photoresist solvent. A pre-treatment oxygen plasma step to further reduce the hardened skin of the photoresist prior to a standard photoresist strip step may also be used.

At this point, an additional technique in accordance with the disclosure herein may be employed wherein a gaseous material, e.g. liquid carbon dioxide ($CO_2$), is employed to further reduce the re-deposited material. In operation, the liquid carbon dioxide may be passed through a nozzle through which it is expanded and a substantially steady flow of fast-moving carbon dioxide particles and carbon dioxide gas is formed. By directing this stream at the resultant recording head structure, the particles serve to remove any re-deposited material, which loosened material is then carried away by the carbon dioxide gas.

Particularly disclosed herein is process for producing a magnetic recording head pole and a recording head made by a process comprising the steps of providing a substrate, forming a layer of relatively high magnetic moment material on a surface of the substrate and patterning a photoresist area on an exposed surface of the formed layer to define the pole. A portion of the exposed surface of the formed layer at least partially underlying the photoresist area is removed to a predetermined lateral width and depth, the formed layer surrounding the photoresist area is further removed to produce the pole, the photoresist area overlying the pole is then stripped away and any re-deposited material remaining on the pole is substantially removed.

Further disclosed herein is a process for removing re-deposited material in a thin film device structure which comprises the steps of providing a source of a gaseous material and directing the gaseous material through a nozzle directed toward the thin film device to produce particles and an associated gas comprising the gaseous material. The re-deposited material is respectively removed and carried away from the device structure by the particles and associated gas.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1A:
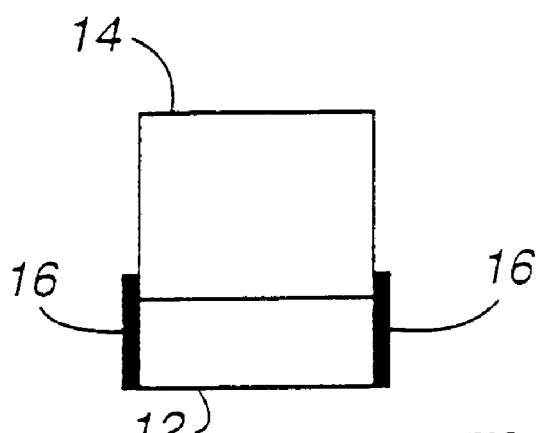
FIG. 1A illustrates a conventional process step in the formation of a pole for a magnetic recording head in which the pole is defined by a photoresist area and wherein the structure is then subjected to a dry etching operation, such as ion milling, and which results in the undesired and continuous re-deposition of material on the sides of the pole and the photoresist area.

With reference now to FIG. 1A, a conventional process step in the formation of a pole 10 for a magnetic recording head is shown. In this example, a relatively high magnetic moment material 12 has been previously sputtered on a substrate (not shown) and the pole 10 has been defined by an overlying photoresist area. The structure has then been subjected to a dry etching operation, such as ion milling process, and an undesired and continuous re-deposition of the high magnetic moment material 12 comprising re-deposited material 16 can be observed to have occurred on the sides of the pole 10 and the photoresist area 14.

Figure 1B:
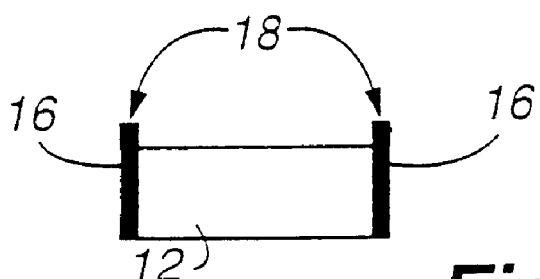
FIG. 1B illustrates a follow-on operation to the conventional process step shown in FIG. 1A following the stripping of the photoresist area and wherein the re-deposited material adhering to the pole remains as undesired "bunny ears" which promote the formation of voids between them following encapsulation (or overcoat), particularly with the narrow pole widths required for higher areal recording density using relatively high magnetic moment materials.

With reference additionally to FIG. 1B, a follow-on operation to the conventional process step shown in FIG. 1A is shown following the stripping of the photoresist area 14. As can be seen, the re-deposited material 16 adhering to the pole 10 remains as undesired "bunny ears" 18 which lead to voids in subsequent encapsulation (or overcoat), particularly when used in conjunction with narrow track width heads needed for high density storage devices.

Figure 2A:
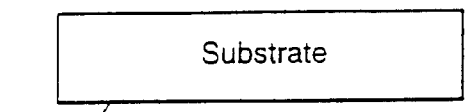
FIGS. 2A through 2G illustrate a processing sequence in accordance with an embodiment of the present invention in which a combination of wet and dry etching steps are utilized to first provide an undercut in the relatively high magnetic moment material beneath the photoresist area such that any re-deposition of material on the sides of the pole and photoresist area which occurs during the dry etching step is advantageously rendered substantially discontinuous, or weakly linked, and the re-deposited material remaining on the pole itself following a photoresist strip step can be removed by being subjected to a stream of gaseous particles and carried away by the accompanying gas stream itself.
Figure 2B:
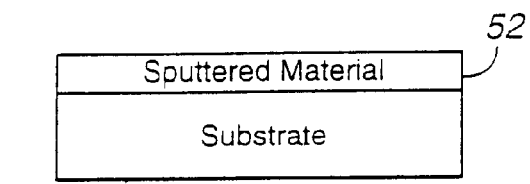
Figure 2C:
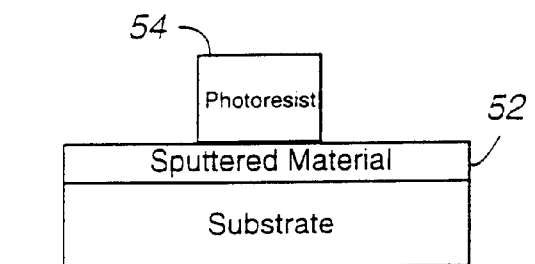

With reference additionally now to FIGS. 2A through 2G, a representative processing sequence in accordance with the present invention is shown. As illustrated in FIG. 2A, a substrate 50 is provided for subsequent forming of a relatively high magnetic moment material layer 52 as shown in FIG. 2B. In a particular application of the present invention, the substrate 50 may comprise a shared shield with an overlying write gap material on which the MR or GMR writer is formed. The relatively high magnetic moment material layer 52 may, in a preferred embodiment, be formed in a conventional sputtering operation utilizing cobalt-zirconium-tantalum (CoZrTa), iron-aluminum-nitride (FeAlN), iron-tantalum-nitride (FeTaN), iron-nitride (FeN) or other similar materials. As shown in the following FIG. 2C, a photoresist area 54 is then patterned on the exposed surface of the relatively high magnetic moment material layer 52 to subsequently define the pole of the magnetic recording head.

Figure 2D:
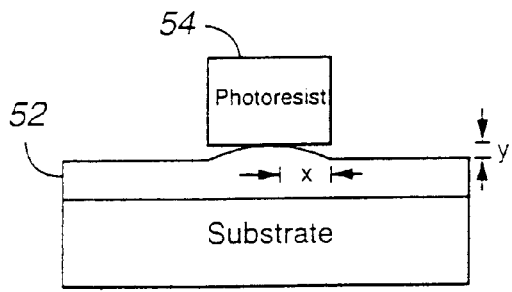

As illustrated in FIG. 2D, a wet etching step is then utilized to remove a portion of the exposed surface of the relatively high magnetic moment material layer 52 surrounding the photoresist area 54 and to provide an under cut in the layer 52 beneath the photoresist area 54. The wet etching operation is advantageously conducted until the undercuts beneath the photoresist area 54 have a lateral width ("X") which is substantially three times (or greater) than the depth ("Y") of the material removed from the relatively high magnetic moment material layer 52. It should be noted that other processing steps and other width-to-depth ratios (X:Y) may be utilized to provide the desired undercuts shown. In a representative application wherein a 4 micron thick pole is produced, the ratio X:Y may be advantageously in the range of substantially 2.2:0.7 microns to 3.2:1.0 microns.

Figure 2E:
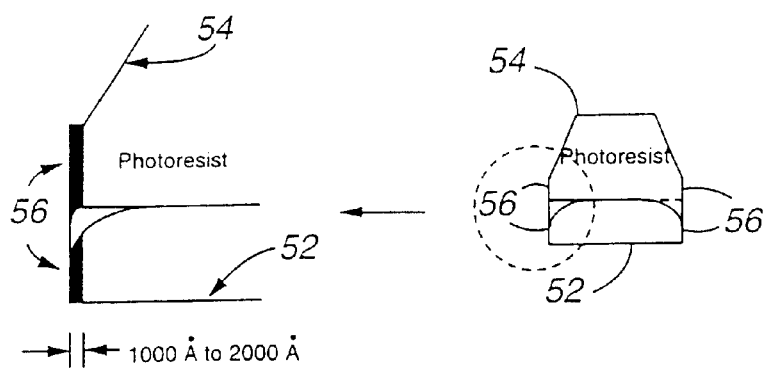

As shown in FIG. 2E, the structure illustrated in the preceding figure is shown following a dry etching step, such as ion-milling, with the view of the substrate being omitted for purposes of clarity. The dry etching step may preferably be a timed etch although it is possible that other techniques such as end point detection may be utilized instead. The dry etching step is a relatively long process step which results in the undesired re-deposition of materials, particularly the relatively high magnetic moment material of layer 52, on the sides of both the relatively high magnetic moment material layer 52 itself as well as on the sides of the photoresist area 54. Importantly, because of the lateral undercuts formed in the preceding step, this layer 56 of re-deposited material is then rendered as substantially discontinuous or continuous with weak links as shown. The re-deposited layer 56 is made up of a composite of the relatively high magnetic moment material 52, photoresist 54 and the substrate 50. Its thickness is dependent on the amount of material removed by the wet and dry etch steps and the more material that is removed by the wet etch steps results in a thinner re-deposited layer 56. As an example, a relatively insignificant amount of the composite material comprising the re-deposited layer 56 (ranging substantially between 1000 angstroms to 2000 angstroms in thickness) might be re-deposited on the side of a 4.0 micron thick pole following the 1.0 micron removal of material in a wet etch step. In contrast, the "bunny ear" structures formed utilizing prior art techniques might be on the order of 1.0 microns in thickness on a 4.0 micron pole. It should be noted that the herein disclosed utilization of a combination of wet and dry etching steps provides the advantage of being able to use a thinner photoresist layer for patterning the pole as compared with the prior art technique wherein ion-milling is carried out through the entire pole layer. The use of a thinner photoresist coating allows the formation of smaller pole dimensions that are often required for high areal recording density.

Figure 2F:
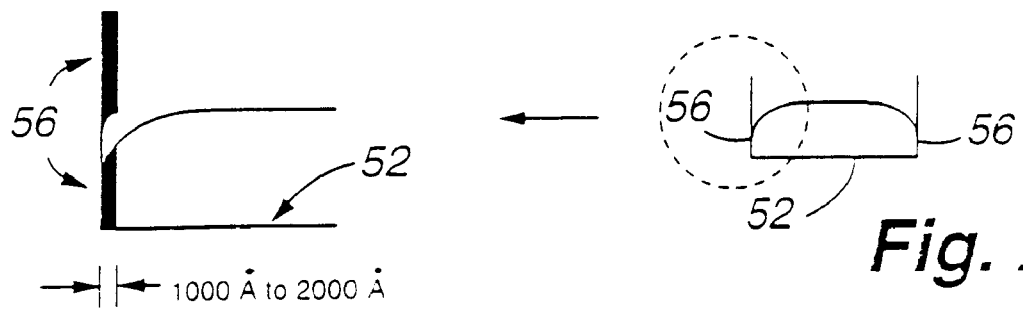

Consequently, by rendering the re-deposited layer 56 substantially discontinuous, or weakly linked, the significant advantage of greatly facilitating the solvent strip of the photoresist area 54 is provided as shown in FIG. 2F. It should be noted that an oxygen plasma process may be carried out to etch away the skin surface of the photoresist area 54 which forms due to the relatively long ion milling operation prior to the photoresist stripping step.

As shown in FIG. 2F, a portion of the re-deposited layer 56 still remains on the remaining portion of the relatively high magnetic moment material layer 52 which will ultimately serve as the recording head pole 60. (The thickness of the pole 60 is generally in the range of 2.0–4.0$\mu$).

Figure 2G:
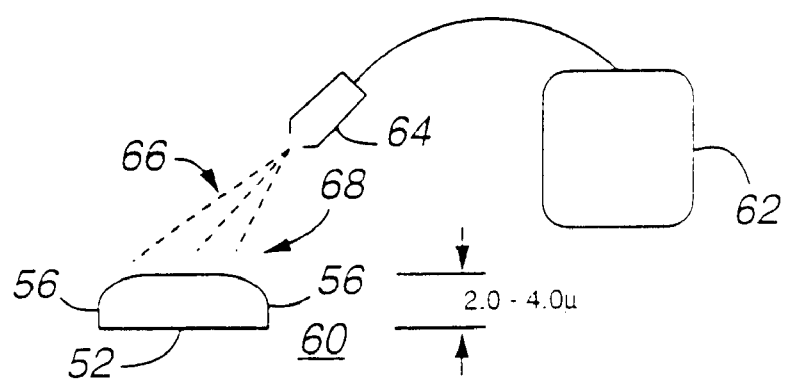

With reference additionally now to FIG. 2G, the substantially discontinuous portion of the re-deposited material and the weakly linked portion of layer 56 may then be removed to provide the final pole 60 structure through the provision of a source of gaseous material 62, for example carbon dioxide ($CO_2$), which is then passed through a nozzle 64 to provide a source of $CO_2$ particles 66 and an accompanying gas stream 68 and directed at the re-deposited layer 56 as is shown schematically in this figure. The relatively steady flow of fast moving solid $CO_2$ particles 66 this provides serves to remove the material comprising re-deposited layer 56 from the pole 60 and the material is then swept away from the pole 60 by the accompanying gas stream 68. In some applications, an ultrasonic de-ionized water may also be utilized to remove the substantially discontinuous and weakly linked portions of the re-deposited layer 56.

It should be noted that in some instances, an insignificantly thin re-deposited layer 56 might remain on the sides of the pole tip without causing any significant degradation in the magnetic recording head performance. A description of a potentially applicable gaseous material cleaning technique used in the context of other unrelated cleaning operations is given in U.S. Pat. No. 5,315,793 issued May 31, 1994 for "System for Precision Cleaning by Jet Spray", the disclosure of which is herein incorporated by this reference.

What has been provided, therefore, is a recording head pole production process, and a pole made by the process, in which a combination of wet and dry etching steps are utilized to provide an undercut in the relatively high magnetic moment material beneath a photoresist area such that any re-deposited layer of material which occurs on the sides of the pole and photoresist area during the dry etching operation is advantageously rendered substantially discontinuous, or weakly linked, and the re-deposited material remaining on the pole itself following a photoresist strip can then be removed by being subjected to a stream of gaseous particles and ultimately carried away by the accompanying gas stream itself.

While there have been described above the principles of the present invention in conjunction with specific process sequences and pole structures, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A process for producing a magnetic recording head pole comprising:

providing a substrate;

forming a layer of relatively high magnetic moment material on a surface of said substrate;

patterning a photoresist area on an exposed surface of said formed layer to define said pole;

removing a portion of said exposed surface of said formed layer at least partially underlying said photoresist area to a predetermined lateral width and depth;

further removing said formed layer surrounding said photoresist area to produce said pole;

stripping away said photoresist area overlying said pole; and substantially removing any re-deposited material remaining on said pole.

2. The process of claim 1 wherein said step of providing said substrate is carried out utilizing a pole material on which a write gap layer has been formed.

3. The process of claim 1 wherein said step of forming a layer of relatively high magnetic moment material is carried out by the step of:

sputtering said relatively high magnetic moment material.

4. The process of claim 3 wherein said step of sputtering said relatively high magnetic moment material is performed by depositing cobalt-zirconium-tantalum, iron-aluminum-nitride, iron-tantalum-nitride or iron nitride.

5. The process of claim 1 wherein said step of removing a portion of said exposed surface of said formed layer comprises the step of:

wet-etching said exposed surface of said formed layer.

6. The process of claim 1 wherein said step of further removing said formed layer surrounding said photoresist area comprises the step of:

dry-etching said exposed surface of said formed layer.

7. The process of claim 6 wherein said step of dry-etching said exposed surface of said formed layer comprises the step of:

ion-milling said exposed surface of said formed layer.

8. The process of claim 1 wherein said step of stripping away said photoresist area comprises the step of:

exposing said photoresist area to oxygen plasma prior to said step of stripping away said photoresist.

9. The process of claim 1 wherein said step of substantially removing any re-deposited material comprises the step of:

directing a gaseous material comprising gaseous material particles and gas toward said pole.

10. The process of claim 9 wherein said step of directing said gaseous material is carried out by the steps of:

providing liquid carbon dioxide;

allowing said liquid carbon dioxide to expand through a nozzle to produce a gaseous stream of carbon dioxide particles and gas; and directing said gaseous stream towards said pole.

11. A process for removing re-deposited material in a thin film device structure comprising:

providing a source of a gaseous material; and directing said gaseous material through a nozzle directed toward said thin film device to produce particles and an associated gas comprising said gaseous material, said re-deposited material being respectively removed and carried away from said device structure by said particles and associated gas.

12. The process of claim 11 wherein said gaseous material comprises carbon dioxide.

* * * * *